United States Patent
Shin et al.

(10) Patent No.: US 11,972,453 B2
(45) Date of Patent: Apr. 30, 2024

(54) SYSTEM FOR MEDIATING ADVERTISEMENT AND OPERATION METHOD THEREFOR

(71) Applicants: SAMSUNG ELECTRONICS CO., LTD., Suwon-si (KR); CHEIL COMMUNICATIONS INC., Seoul (KR)

(72) Inventors: Jaehyuck Shin, Suwon-si (KR); Sanghyo Kim, Suwon-si (KR); Changsoo Moon, Seoul (KR); Kichan Ryu, Suwon-si (KR); Daewon Cho, Suwon-si (KR)

(73) Assignees: SAMSUNG ELECTRONICS CO., LTD., Suwon-si (KR); CHEIL COMMUNICATIONS INC., Seoul (KR)

( * ) Notice: Subject to any disclaimer, the term of this patent is extended or adjusted under 35 U.S.C. 154(b) by 0 days.

(21) Appl. No.: 17/261,298

(22) PCT Filed: May 8, 2019

(86) PCT No.: PCT/KR2019/005495
§ 371 (c)(1),
(2) Date: Jan. 19, 2021

(87) PCT Pub. No.: WO2020/017745
PCT Pub. Date: Jan. 23, 2020

(65) Prior Publication Data
US 2021/0279765 A1 Sep. 9, 2021

(30) Foreign Application Priority Data
Jul. 20, 2018 (KR) .................. 10-2018-0084769

(51) Int. Cl.
*G06Q 30/00* (2023.01)
*G06Q 30/0241* (2023.01)
(Continued)

(52) U.S. Cl.
CPC ..... *G06Q 30/0242* (2013.01); *G06Q 30/0251* (2013.01); *G06Q 30/0276* (2013.01); *G06Q 30/0277* (2013.01)

(58) Field of Classification Search
None
See application file for complete search history.

(56) References Cited

U.S. PATENT DOCUMENTS 8,788,343 B2 7/2014 Burdick et al.
10,909,576 B1 * 2/2021 Arivukkarasu .... G06Q 30/0269
(Continued)

FOREIGN PATENT DOCUMENTS

JP          6346684      6/2018
KR    10-2007-0120344   12/2007
(Continued)

OTHER PUBLICATIONS

Khare, Rohit, and Benjamin CW Sittler. Decentralising sponsored Web advertising. CommerceNet Labs Technical Report 05-04. Retrieved May 12, 2006, from http://wiki. commerce. net/images/b/bb/CN-TR-05-04. pdf, 2005. (Year: 2005).*
(Continued)

*Primary Examiner* — Michael Bekerman
(74) *Attorney, Agent, or Firm* — Nixon & Vanderhye, P.C.

(57) ABSTRACT

An advertisement mediating system includes: a communicator configured to receive, from a first device, information about content into which an advertisement is to be inserted and information about an inventory included in the content, and transmitting, to one or more second devices, the infor-
(Continued)

mation about the content and the information about the inventory; a memory storing one or more instructions; and a processor configured to execute the one or more instructions stored in the memory, wherein the processor is configured to execute the one or more instruction to perform, when a request for inserting the advertisement into the inventory is received from the one or more second devices, a control operation of selecting advertisement content from among a plurality of pieces of advertisement content corresponding to the one or more second devices, receiving the selected advertisement content, and transmitting the advertisement content to a third device that executes the content.

11 Claims, 15 Drawing Sheets

(51) Int. Cl.
*G06Q 30/0242* (2023.01)
*G06Q 30/0251* (2023.01)

(56) References Cited

U.S. PATENT DOCUMENTS

| | | | |
|---|---|---|---|
| 2002/0120589 A1 | 8/2002 | Aoki | |
| 2008/0294516 A1* | 11/2008 | Leader | G06Q 30/02 705/14.71 |
| 2009/0287554 A1 | 11/2009 | Kim | |
| 2010/0082425 A1* | 4/2010 | Yang | G06Q 30/02 705/14.46 |
| 2012/0109741 A1 | 5/2012 | Ballapragada | |
| 2012/0158472 A1* | 6/2012 | Singh | G06F 16/29 705/14.4 |
| 2012/0221404 A1* | 8/2012 | Ahmed | G06Q 30/0261 705/14.39 |
| 2014/0310094 A1* | 10/2014 | Shapira | G06Q 30/0244 705/14.45 |
| 2017/0032420 A1* | 2/2017 | Khilnani | G06Q 30/0261 |
| 2017/0098238 A1 | 4/2017 | Ko | |
| 2019/0272560 A1* | 9/2019 | Shin | G06N 3/04 |

FOREIGN PATENT DOCUMENTS

| | | | | |
|---|---|---|---|---|
| KR | 10-2009-0074197 | | 7/2009 | |
| KR | 20110001451 A | * | 1/2011 | ......... G06Q 30/0246 |
| KR | 10-1206264 | | 12/2012 | |
| KR | 10-2013-0104568 A | | 9/2013 | |
| KR | 10-2014-0022298 | | 2/2014 | |
| KR | 10-2014-0108426 A | | 9/2014 | |
| KR | 10-2016-0062299 | | 6/2016 | |
| WO | 2014/021915 A1 | | 2/2014 | |

OTHER PUBLICATIONS

Extended Search Report dated Dec. 14, 2020 in counterpart European Patent Application No. 19837209.6.
Search Report dated Aug. 21, 2019 in counterpart International Patent Application No. PCT/KR2019/005495 and English-language translation.
Written Opinion dated Aug. 21, 2019 in counterpart International Patent Application No. PCT/KR2019/005495 and English-language translation.
Office Action dated Jul. 26, 2023 in counterpart Korean Patent Application No. 10-2018-0084769 and English-language translation.
Notice of Allowance dated Feb. 27, 2024 in KR Patent Application No. 10-2018-0084769 and English-language translation.
Office Action dated Jan. 23, 2024 in CN Patent Application No. 201980040414.8 and English-language translation.
Communication pursuant to Article 94(3) EPC dated Dec. 21, 2023 in EP Patent Application No. 19837209.6.

* cited by examiner

SYSTEM FOR MEDIATING ADVERTISEMENT AND OPERATION METHOD THEREFOR

This application is the U.S. national phase of International Application No. PCT/KR2019/005495 filed May 8, 2019 which designated the U.S. and claims priority to KR Patent Application No. 10-2018-0084769 filed Jul. 20, 2018, the entire contents of each of which are hereby incorporated by reference.

TECHNICAL FIELD

Various embodiments relate to a system for mediating with respect to an advertisement and an operation method thereof, and more particularly, a system of mediating with respect to an advertisement to be inserted into content between a content developer and an advertiser, and an operation method thereof.

BACKGROUND ART

Existing digital advertisement markets are dominated by web banner advertisements. The digital advertisement markets are largely divided into supply side platforms (SSPs), demand side platforms (DSPs), and advertisement mediating platforms connecting the SSPs to the DSPs. As an example of an advertisement mediating platform, AD exchange (ADX) is a platform on which SSPs and DSPs buy and sell advertisements by using a real-time bidding method.

With the rapid growth in supply of mobile devices, in-app advertisement markets are also expanding rapidly. In-app advertisements are dominated by banner advertisements, pop-up advertisements, video advertisement, and front advertisements. Also, with the rapid growth in supply of mobile devices, the mobile game population has explosively increased accordingly, and many game companies including small game companies and one-man developers as well as big game companies are starting up. Such game companies distribute free games and create profit through advertisements. Also, multidimensional virtual environment technology, such as augmented reality (AR), virtual reality (VR), third-dimensional (3D) animation, and movie computer-generated imagery (CGI), is being widely used in the media and entertainment industries.

It is difficult to change advertisement content of existing advertisements after they are released, because they were sold and applied when content, such as AR, VR and games, was produced. Also, games adopting existing in-app advertisements disrupt content users due to advertisements obstructing the screen, unwanted transitions caused by wrong clicking, etc. Accordingly, negative views about in-app advertisements are increasing.

SUMMARY

Various embodiments may provide a system capable of providing a content user with a customized advertisement when content is executed by providing a content developer with software enabling the content developer to easily create an inventory in the content and mediating with respect to an advertisement to be inserted into the content between the content developer and an advertiser, and an operation method of the system.

An advertisement mediating system according to an embodiment includes: a communicator configured to receive, from a first device, information about content into which an advertisement is to be inserted and information about an inventory included in the content, and transmit, to one or more second devices, the information about the content and the information about the inventory; a memory storing one or more instructions; and a processor configured to execute the one or more instructions stored in the memory, wherein the processor is configured to execute the one or more instructions to perform, when a request for inserting the advertisement into the inventory is received from the one or more second devices, a control operation of selecting advertisement content from among a plurality of pieces of advertisement content corresponding to the one or more second devices, receiving the selected advertisement content, and transmitting the advertisement content to a third device that executes the content.

A system according to an embodiment may provide a content developer with advertisement module software such that the content developer may easily create an inventory (an advertisement area) in content.

A system according to an embodiment may insert advertisement content into an inventory set in an object included in content to provide a customized advertisement without interfering with execution of the content by a content user.

A system according to an embodiment may analyze a real-time bidding method and results of exposures to advertisements to determine a reasonable advertising fee, and easily pay a content developer an advertising commission.

DETAILED DESCRIPTION OF EXAMPLE EMBODIMENTS

Figure 1:
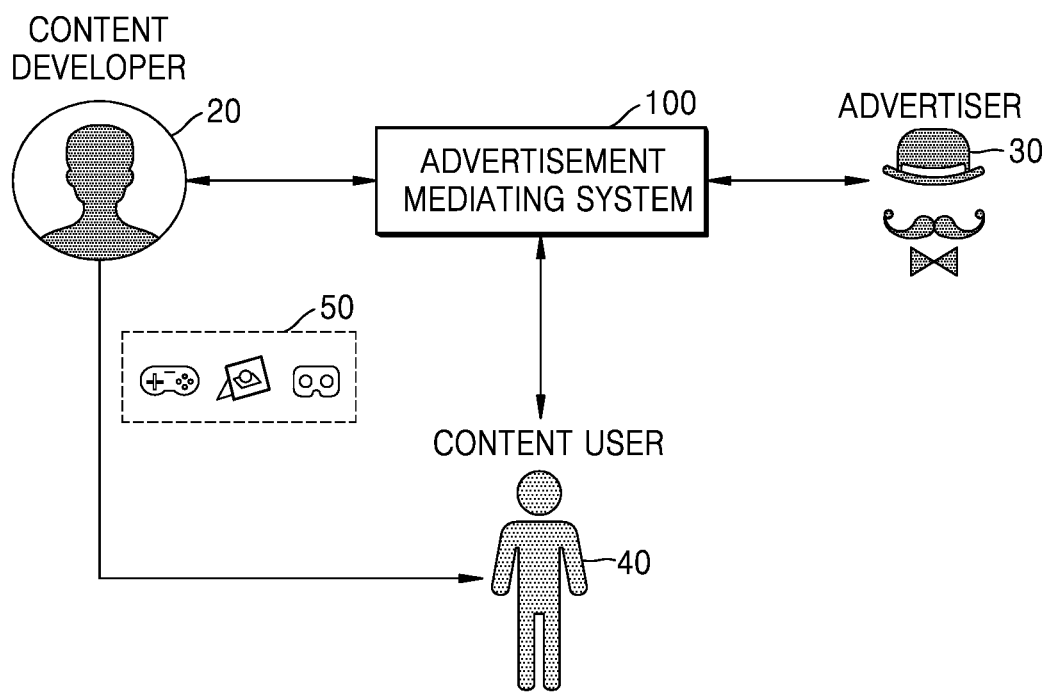
FIG. 1 shows a system of mediating with respect to an advertisement, according to an embodiment.

An advertisement mediating system according to an embodiment includes: a communicator configured to receive information about content into which an advertisement is to be inserted and information about an inventory included in the content from a first device, and transmit the information about the content and the information about the inventory to one or more second devices; a memory storing one or more instructions; and a processor configured to execute the one or more instructions stored in the memory, wherein the processor is configured to execute the one or more instructions to perform, when a request for inserting an advertisement into the inventory is received from the second devices, a control operation of selecting advertisement content from among a plurality of pieces of advertisement content corresponding to the second devices, receiving the selected advertisement content, and transmitting the advertisement content to a third device that executes the content.

The information about the content according to an embodiment may include at least one of a kind of the content, category information of the content, provider information of the content, and information about a target user of the content.

The information about the inventory according to an embodiment may include at least one of information about an object in which the inventory is set, size information of the inventory, shape information of the inventory, information about a format of an advertisement that is insertable into the inventory, and context information of the inventory.

The inventory according to an embodiment may be set in an object included in the content.

The processor according to an embodiment may be further configured to execute the one or more instructions to perform a control operation of transmitting advertisement module software for generating the inventory in the content to the first device.

The processor according to an embodiment may be further configured to execute the one or more instructions to select the advertisement content from among the plurality of pieces of advertisement content corresponding to the second devices, based on at least one of a kind of content to be inserted into the inventory, an advertising period, and a desired purchase price for the inventory, received from the second devices, and the information about the inventory.

The processor according to an embodiment may be further configured to execute the one or more instructions to perform a control operation of transmitting information about the selected advertisement content to the first device, and transmitting information about whether the plurality of pieces of advertisement content have been selected to the second devices.

The processor according to an embodiment may be further configured to execute the one or more instructions to perform a control operation of requesting an external advertisement server to send advertisement content to be inserted into the inventory, transmitting the information about the content and the information about the inventory to the external advertisement server, and receiving the advertisement content to be inserted into the inventory from the external advertisement server.

The processor according to an embodiment may be further configured to execute the one or more instructions to perform a control operation of transmitting the advertisement content received from the external advertisement server to the third device.

The processor according to an embodiment may be further configured to execute the one or more instructions to analyze whether the advertisement content is validly exposed to a user of the content and perform a control operation of transmitting a result of the analyzing to a second device corresponding to the advertisement content.

The processor according to an embodiment may be further configured to execute the one or more instructions to calculate an advertising fee based on the number of times that the advertisement content has been validly exposed, calculate an advertising commission for the advertisement content based on the advertising fee, and perform a control operation of transmitting information about the advertisement commission to the first device.

An operation method of an advertisement mediating system according to an embodiment includes: receiving information about content into which an advertisement is to be inserted and information about an inventory included in the content from a first device; transmitting the information about the content and the information about the inventory to one or more second devices; receiving a request for inserting an advertisement into the inventory from the second devices; selecting advertisement content from among a plurality of pieces of advertisement content corresponding to the second devices, and receiving the selected advertisement content; and transmitting the advertisement content to a third device that executes the content.

A computer program product according to an embodiment may include one or more computer-readable recording media storing a program for receiving information about content into which an advertisement is to be inserted and information about an inventory included in the content from a first device; transmitting the information about the content and the information about the inventory to one or more second devices; receiving a request for inserting an advertisement into the inventory from the second devices; selecting advertisement content from among a plurality of pieces of advertisement content corresponding to the second devices, and receiving the selected advertisement content; and transmitting the advertisement content to a third device that executes the content.

Terms used in this specification will be briefly described, and the disclosure will be described in detail.

Although general terms being widely used in the present specification were selected as terminology used in the disclosure while considering the functions of the disclosure, they may vary according to intentions of one of ordinary skill in the art, judicial precedents, the advent of new technologies, and the like. Terms arbitrarily selected by the applicant of the disclosure may also be used in a specific case. In this case, their meanings will be described in detail in the detailed description of the disclosure. Hence, the terms must be defined based on the meanings of the terms and the contents of the entire specification, not by simply stating the terms themselves.

It will be understood that when a certain part "includes" a certain component, the part does not exclude another component but can further include another component, unless the context clearly dictates otherwise. As used herein, the terms "portion", "module", or "unit" refers to a unit that can perform at least one function or operation, and may be implemented as a software or hardware component or as a combination of software and hardware.

Hereinafter, embodiments of the disclosure will be described in detail with reference to the accompanying drawings so that the disclosure may be readily implemented by those skilled in the art. However, the disclosure is not limited to these embodiments of the disclosure, and may be embodied in various other forms. In the drawings, parts irrelevant to the description are omitted for the simplicity of explanation, and like reference numerals refer to like elements throughout the specification.

In the embodiments of the specification, the term "user" means a person who controls the functions or operations of system, and may include a developer, a manager, or an installation engineer.

FIG. 1 shows a system of mediating with respect to an advertisement, according to an embodiment.

An advertisement mediating system 100 according to an embodiment may be a system connecting a content developer 20 to an advertiser 30. The content developer 20 may be a person who develops content 50 being a medium for transferring an advertisement, and the content developer 20 may develop various formats of content, such as image content, text content, video content, audio content, game content, augmented reality (AR) content, virtual reality (VR) content, and 3Dimensional (3D) content, although not limited thereto.

The content 50 may function as a medium transferring advertisement content to consumers (for example, a content user 40), and provide an inventory (an advertisement area) into which an advertisement is insertable.

Meanwhile, the advertiser 30 may be a main agent performing advertisement activity, and means a person who puts an advertisement. The advertiser 30 may be an individual, a corporation, a company, etc., although not limited thereto.

The advertisement mediating system 100 according to an embodiment may provide the content developer 20 with advertisement module software for setting an inventory in the content 50. The content developer 20 may use the advertisement module software received from the advertisement mediating system 100 to easily set the inventory in the content 50 which he/she intends to develop. The operation will be described in detail with reference to FIGS. 3 and 4.

Also, the content developer 20 may register the inventory included in the content 50 in the advertisement mediating system 100. At this time, the content developer 20 may register information about the content 50 and information about the inventory, together with the inventory, in the advertisement mediating system 100.

The advertiser 30 may select an inventory into which he/she wants to insert an advertisement, based on information about inventories registered in the advertisement mediating system 100, transfer a price, an advertisement condition, etc. of the selected inventory to the advertisement mediating system 100, and make a bid for the selected inventory.

Accordingly, the advertisement mediating system 100 may provide awarded advertisement content to a consumer. The consumer may be the content user 40 who executes content developed by the content developer 20. For example, when the content user 40 executes the content, the awarded advertisement content may be inserted into an inventory area in the content and executed.

The advertisement mediating system 100 according to an embodiment may analyze whether the advertisement content is validly exposed to the content user 40, and provide a result of the analyzing to the advertiser 30. The advertiser 30 may pay an advertising fee to the advertisement mediating system 100 according to the number of times that the advertisement content has been validly exposed, and the advertisement mediating system 100 may pay the content developer 20 a part of the advertising fee.

Figure 2:
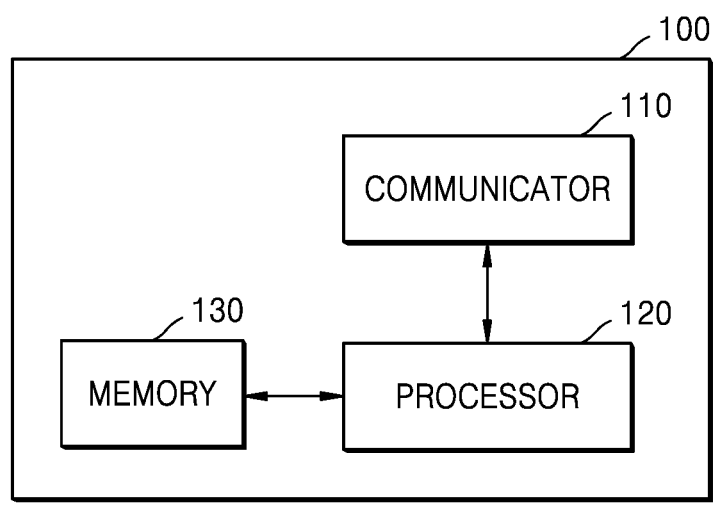
FIG. 2 is a block diagram showing a configuration of an advertisement mediating system according to an embodiment.

FIG. 2 is a block diagram showing a configuration of an advertisement mediating system according to an embodiment.

Referring to FIG. 2, the advertisement mediating system 100 according to an embodiment may include a communicator 110, a memory 130, and a processor 120.

The processor 120 according to an embodiment may control overall operations of the advertisement mediating system 100. The processor 120 may execute one or more programs stored in the memory 130.

The communicator 110 may transmit/receive data or signals to/from an external device or an external server under a control of the processor 120.

The communicator 110 may include one or more components that perform communication through a local area network (LAN), a wide area network (WAN), a value added network (VAN), a mobile radio communication network, a satellite communication network, and a combination thereof. Also, the communicator 110 may directly transmit/receive data or signals wirelessly to/from an external device or an external server by using a wireless LAN (for example, wireless-fidelity (Wi-Fi)), etc.

The communicator 110 according to an embodiment may distribute advertisement module software to a first device through a network. Herein, the first device may be a device that a content developer uses to develop or produce content.

The communicator 110 may receive development environment information from the first device, and transmit advertisement module software corresponding to the development environment to the first device.

Also, the communicator 110 may receive information about content into which an advertisement will be inserted and information about an inventory included in the content from the first device. The information about the content may include at least one of a kind of the content, category information of the content, provider information of the content, and information about a target user of the content. Also, the information about the inventory may include at least one of information about an object in which the inventory is set, size information of the inventory, shape information of the inventory, information about a format of an advertisement that is insertable into the inventory, and context information of the inventory. The context information of the inventory may include context information about a frame in which the inventory is included, although not limited thereto.

Also, the communicator 110 may transmit the information about the content and the information about the inventory to one or more second devices. The second devices may be devices that advertisers use to search for and select content or an inventory into which they will insert advertisement content. The second devices may be devices on which a web page provided by the advertisement mediating system 100 according to an embodiment is displayed.

The memory 130 according to an embodiment may store various data, programs, or applications for driving and controlling the advertisement mediating system 100. Also, the memory 130 may store information about inventories registered in the advertisement mediating system 100. The programs stored in the memory 130 may include one or more instructions. The programs (one or more instructions) stored in the memory 130 may be executed by the processor 120.

When the processor 120 according to an embodiment receives a request for inserting an advertisement into the inventory from the second devices, the processor 120 may select advertisement content from among a plurality of pieces of advertisement content corresponding to the second devices.

For example, the processor 120 may select the advertisement content from among the plurality of pieces of advertisement content corresponding to the second devices, based on at least one of a kind of an advertisement to be inserted into the inventory, an advertising period, and a desired purchase price for the inventory, received from the second devices, and the information about inventories registered in the advertisement mediating system 100.

After selecting the advertisement content, the processor 120 may perform a control operation of transmitting information about the selected advertisement content to the first device and transmitting information about whether advertisement content has been selected to the second devices.

When the advertisement mediating system 100 fails to select advertisement content corresponding to the inventory, the processor 120 may request an external advertisement server to send advertisement content to be inserted into the inventory. The processor 120 may perform a control operation of transmitting information about content including the inventory and information about the inventory to the external advertisement server, and receiving advertisement content to be inserted into the inventory from the external advertisement server.

The processor 120 according to an embodiment may perform a control operation of transmitting the advertisement content corresponding to the inventory to a third device that executes content including the corresponding inventory.

The processor 120 according to an embodiment may analyze whether the advertisement content is validly exposed to a content user, and perform a control operation of transmitting a result of the analyzing to a second device that has provided the advertisement content.

The processor 120 according to an embodiment may calculate an advertising fee based on the number of times that the advertisement content has been validly exposed, and calculate an advertising commission for the advertisement content based on the advertising fee. The processor 120 may request the second devices (advertisers) providing the advertisement content to pay the advertising fee, and perform a control operation of paying the first device (the content developer) an advertising commission.

Meanwhile, the block diagram of the advertisement mediating system 100 shown in FIG. 2 may be a block diagram according to an embodiment. Individual components of the block diagram may be integrated, other components may be added, or some of the components may be omitted, according to a specification of the advertisement mediating system 100 that is actually implemented. That is, two or more components may be integrated into a single component or a single component may be divided into two or more components, as necessary. Also, functions performed by individual blocks are provided to describe embodiments of the disclosure, and detailed operations or devices will not limit the scope of the disclosure.

Figure 3:
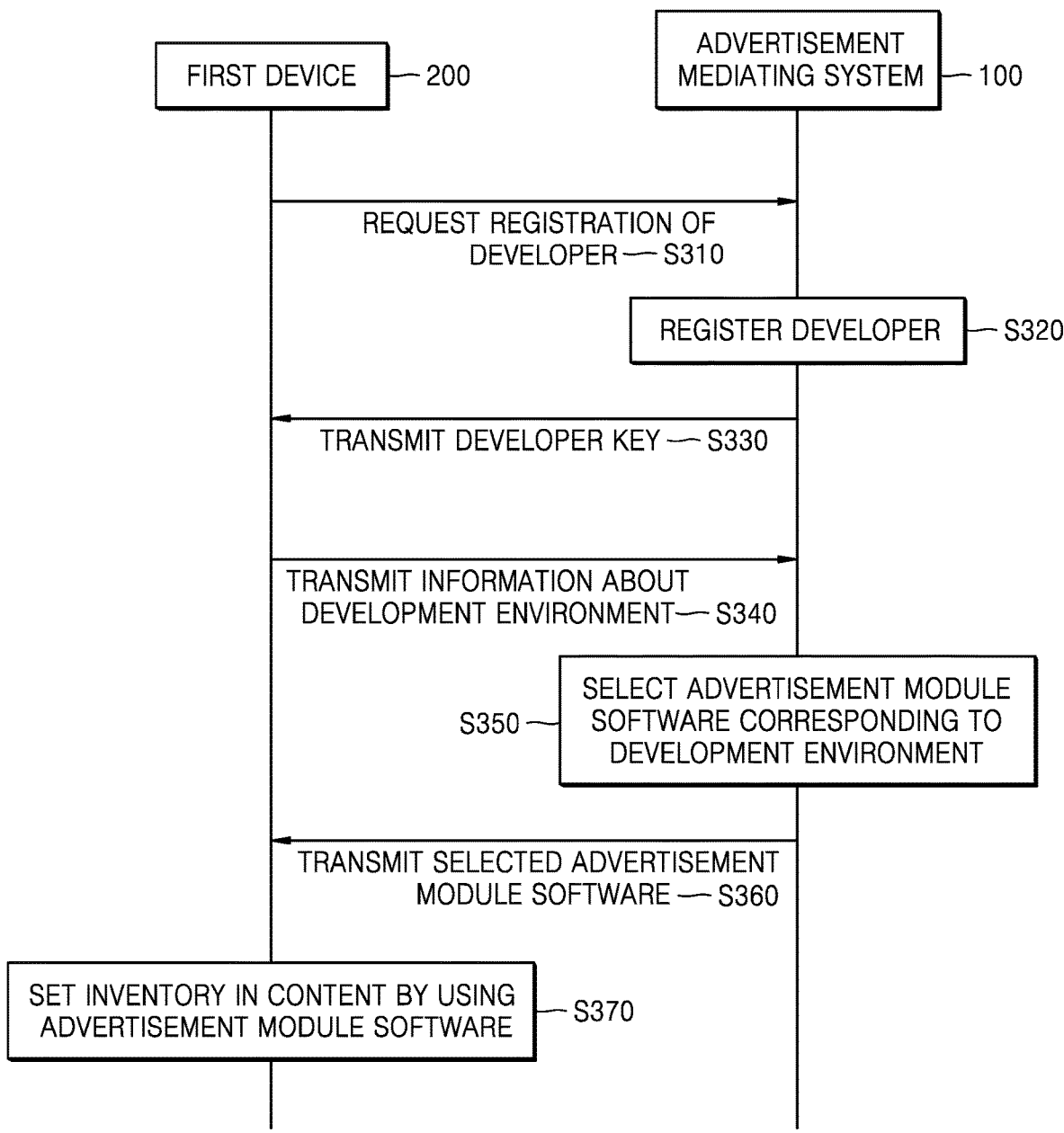
FIG. 3 is a flowchart showing a method of providing advertisement module software in an advertisement mediating system, according to an embodiment.

FIG. 3 is a flowchart showing a method of providing advertisement module software in an advertisement mediating system according to an embodiment.

Referring to FIG. 3, a first device 200 according to an embodiment may request the advertisement mediating system 100 to register a developer, in operation S310.

The first device 200 may be a device that a content developer uses to develop or produce content, and the first device 200 may include a cellular phone, a smart phone, a laptop computer, a desktop computer, a tablet PC, an e-book terminal, a digital broadcasting terminal, personal digital assistants (PDA), a portable multimedia player (PMP), a navigation system, a MP3 player, a camcorder, an internet protocol television (IPTV), a digital television (DTV), a wearable device, etc., although not limited thereto. For example, a user of the first device 200 may sign up for a membership through a web service provided by the advertisement mediating system 100.

When developer registration is requested by the first device 200, the advertisement mediating system 100 may register information about the user (the content developer) of the first device 200, in operation S320, generate a developer key, and transmit the developer key to the first device 200, in operation S330. The developer key may include an identifier (ID) for identifying the user (the content developer) of the first device 200.

The first device 200 may transmit information about a development environment to the advertisement mediating system 100, in operation S340. For example, the first device 200 may transmit information about a kind or version of an operating system (OS) for developing content, information about a capacity of hardware (for example, a central processing unit (CPU)), information about a kind or version of a tool to be used to develop the content, information about a device (for example, a console, a PC, a mobile device, etc.) to execute the content, etc. to the advertisement mediating system 100.

The advertisement mediating system 100 may select advertisement module software from among a plurality of pieces of advertisement module software, based on the information about the development environment received from the first device 200, in operation S350, and transmit the selected advertisement module software to the first device 200, in operation 360.

The first device 200 may set an inventory (an advertisement area) in content to be developed by using the advertisement module software downloaded from the advertisement mediating system 100, in operation S370. Operation S370 will be described in detail with reference to FIG. 4.

Figure 4:
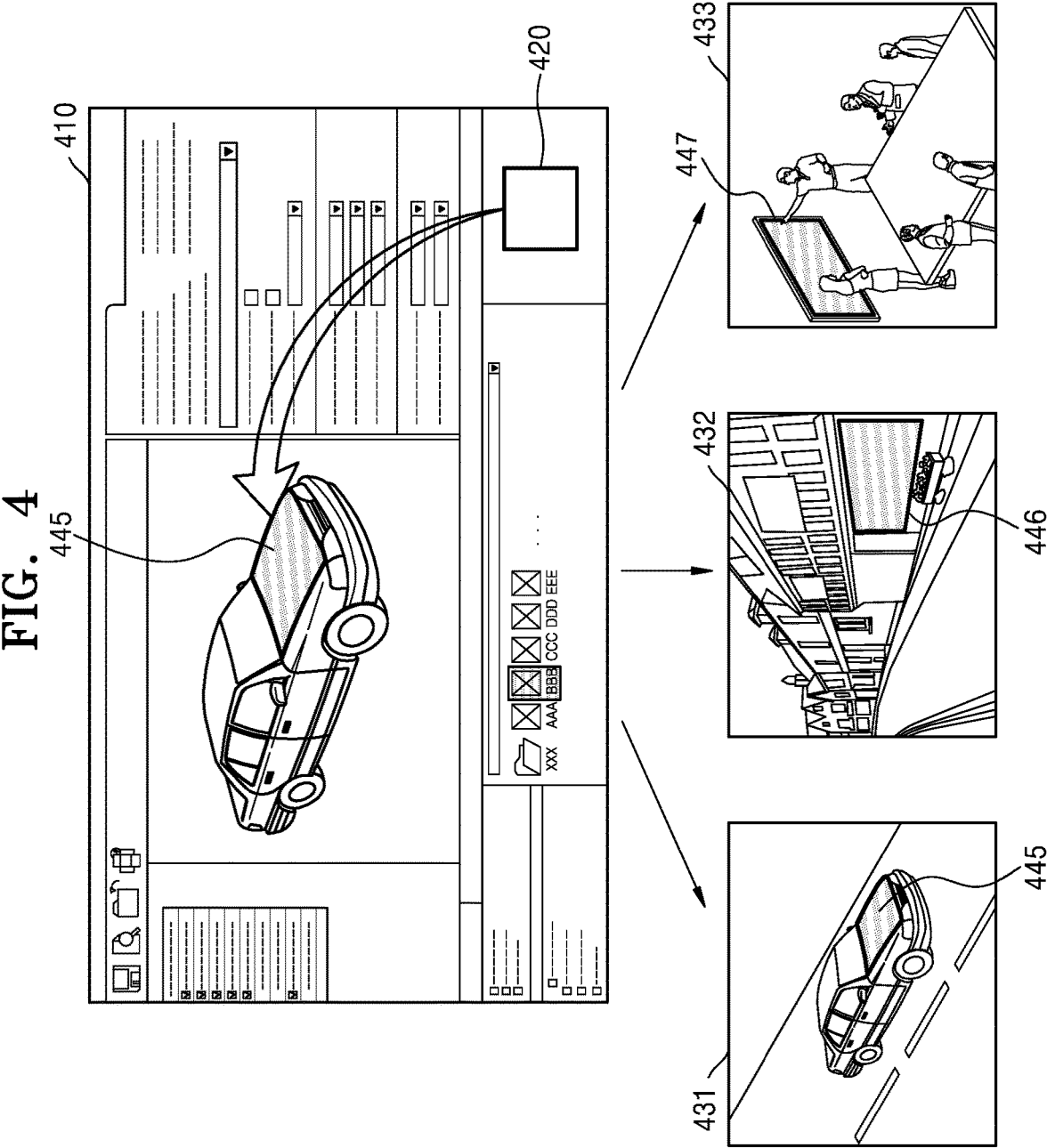
FIG. 4 is a reference view for describing a method of generating an inventory in content by using advertisement module software in a first device, according to an embodiment.

FIG. 4 is a reference view for describing a method of generating an inventory in content by using advertisement module software in a first device according to an embodiment.

Advertisement module software according to an embodiment may be provided by a plug-in method. For example, advertisement module software may be added to a development tool that a content developer uses to develop content, and, as shown in FIG. 4, an icon 420 corresponding to an advertisement module software function may be displayed on a development tool screen 410. The development tool screen 410 may be displayed on the first device 200 according to an embodiment.

The content developer may generate an inventory in content by dragging and dropping the icon 420. For example, as shown in FIG. 4, the first device 200 may receive an input of dragging and dropping the icon 420 to a bonnet area 445 of a vehicle included in a first frame 431 of content, and set the bonnet area 445 of the vehicle to an inventory area.

Alternatively, the first device 200 may use the advertisement module software function to set a sign 446 included in a second frame 432 of the content or a billboard 447 included in a third frame 433 of the content to an inventory area.

Meanwhile, the inventory area may be generated at an object in the content, although not limited thereto. However, the inventory area may be generated as an area having various shapes and sizes. For example, an inventory may be generated at an arbitrary location in the content, with the content developer's desired shape or size.

The first device 200 may set a condition for advertisement content that is to be inserted into the generated inventory. For example, the first device 200 may set a kind, size, etc. of advertisement content that is to be inserted into the inventory, although not limited thereto.

Figure 5:
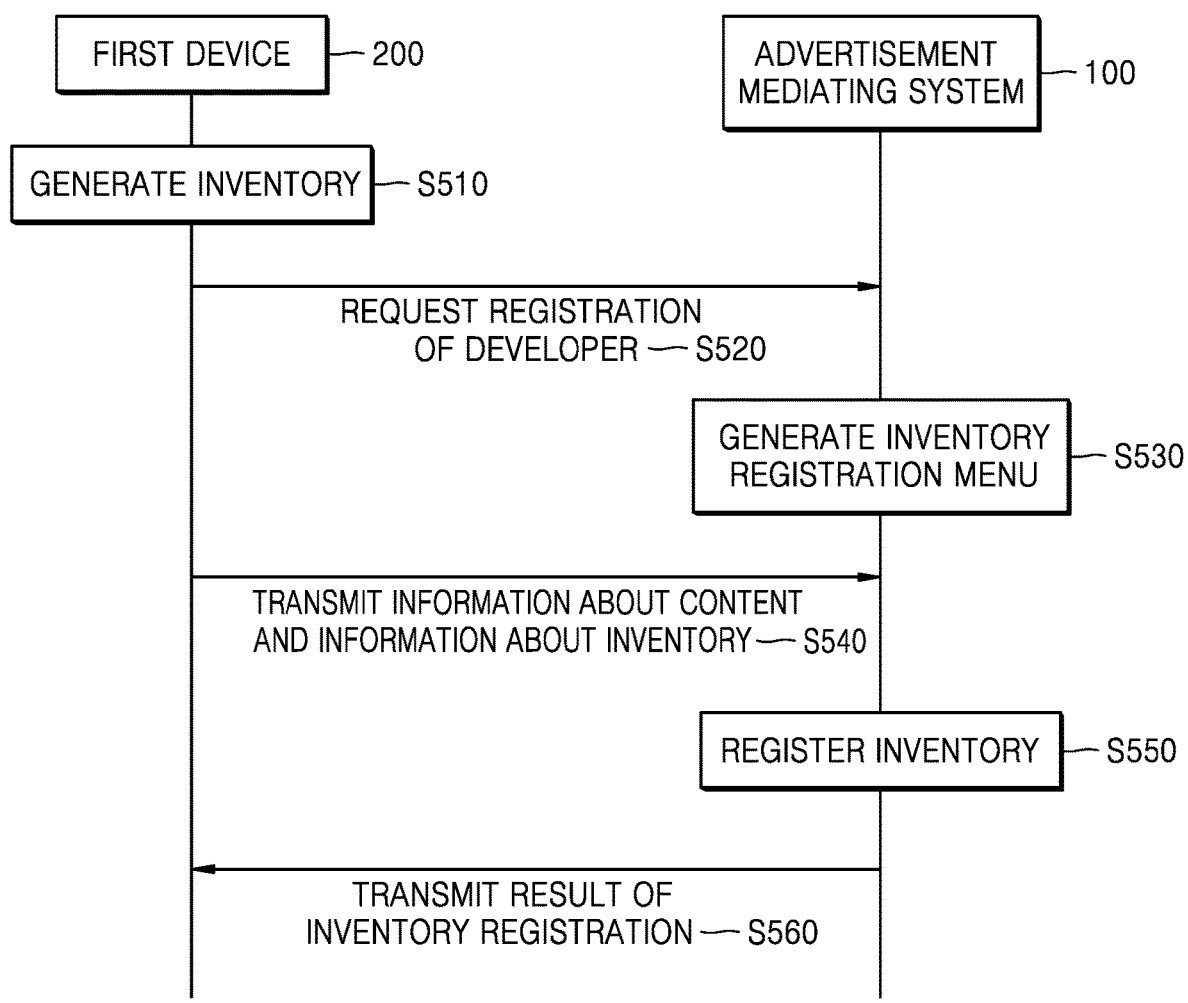
FIG. 5 is a flowchart showing a method in which a first device according to an embodiment registers an inventory in an advertisement mediating system.
Figure 6:
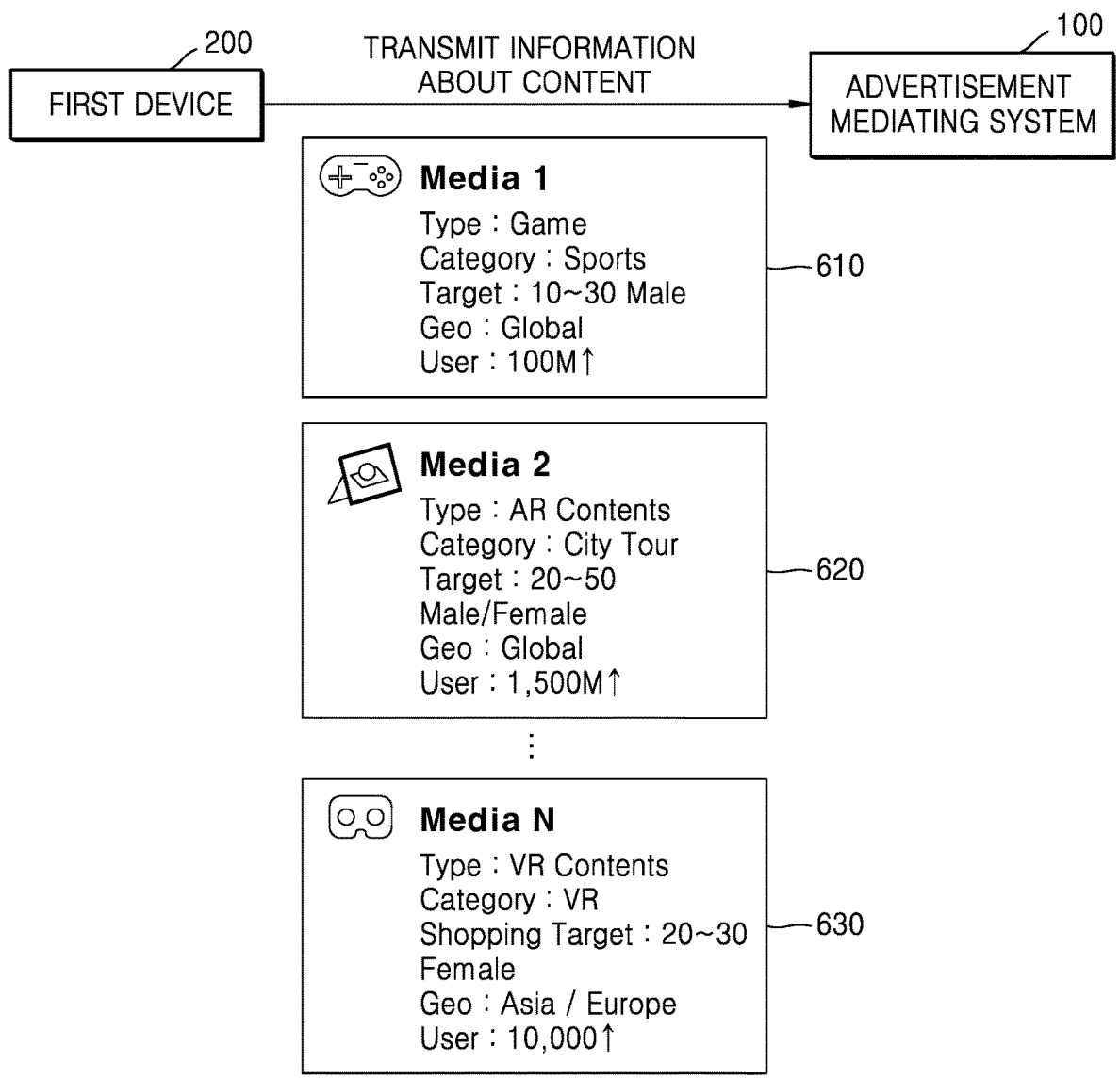
FIGS. 6 and 7 are reference views for describing a method in which a first device according to an embodiment registers an inventory in an advertisement mediating system.
Figure 7:
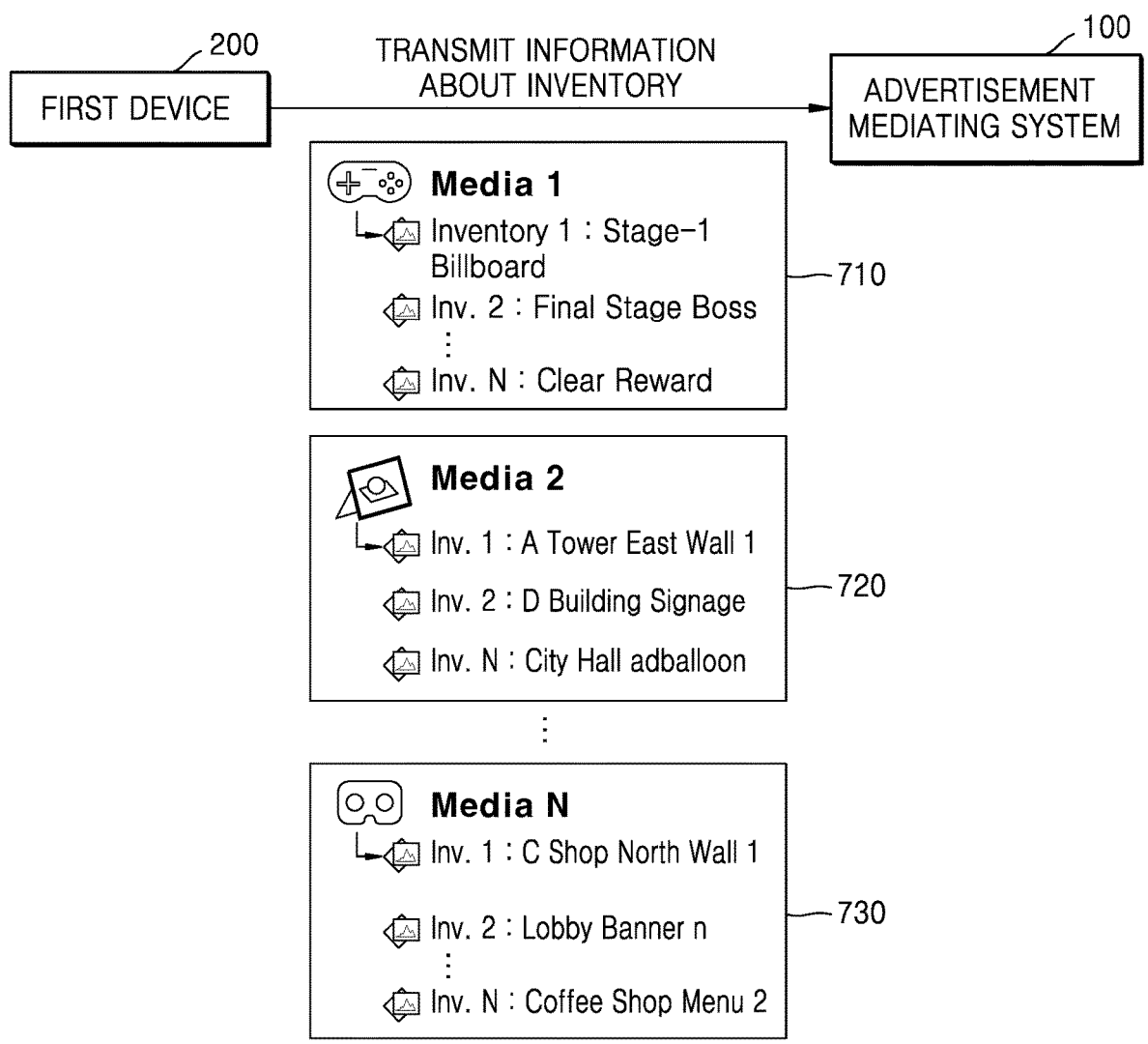

FIG. 5 is a flowchart showing a method in which a first device according to an embodiment registers an inventory in an advertisement mediating system, and FIGS. 6 and 7 are reference views for describing a method in which a first device according to an embodiment registers an inventory in an advertisement mediating system.

Referring to FIG. 5, the first device 200 may generate an inventory in content, in operation S510. Operation S510 has been described above with reference to FIGS. 3 and 4, and therefore, detailed descriptions thereof will be omitted.

The first device 200 may request the advertisement mediating system 100 to register the generated inventory, in operation S520.

When the advertisement mediating system 100 receives an inventory registration request from the first device 200, the advertisement mediating system 100 may generate an inventory registration menu, in operation S530, and display the inventory registration menu on a web page provided by the advertisement mediating system 100. The web page may be displayed on the first device 200.

The first device 200 may transmit information about content into which an advertisement is to be inserted and information about the inventory included in the content to the advertisement mediating system 100 by using the inventory registration menu, in operation 540.

The information about the content may include at least one of a kind of the content, category information of the content, provider information of the content, and information about a target user of the content.

For example, referring to FIG. 6, the first device 200 may transmit information 610 about first content Media 1, information 620 about second content Media 2, and information 630 about third content Media N to the advertisement mediating system 100. The information 610 about the first content Media 1 may include information representing that the first content Media 1 is game content, the first content Media 1 is game content related to sports of which target users are males in their teens to thirties, a use region of the first content Media 1 is a global region, and an anticipated number of users is one hundred thousand peoples or more.

Also, the information 620 about the second content Media 2 may include information representing that the second content Media 2 is AR content related to a city tour and target users are males/females in their twenties to fifties. Also, the information 630 about the third content Media 3 may include information representing that the third content Media 3 is VR content related to shopping, target users are females in their twenties to thirties, and the third content Media 3 is usable in Asia or Europe, although not limited thereto.

The advertisement mediating system 100 may receive information about content from the first device 200, and determine whether to register the corresponding content based on the information about the content. For example, when the information about the content received from the first device 200 does not meet preset criterion, the advertisement mediating system 100 may transmit a message indicating that the content is disallowed to be registered to the first device 200. In contrast, when the information about the content meets the preset criterion, the advertisement mediating system 100 may register the corresponding content.

Meanwhile, the information about the inventory according to an embodiment may include at least one of information about an object in which the inventory is set, size information of the inventory, shape information of the inventory, information about a format of an advertisement that is insertable into the inventory, and context information of the inventory. The context information of the inventory may include context information for a frame in which the inventory is included. For example, in the case of game content, context information of an inventory may include information about which stage of the game a frame including the inventory corresponds to or information (for example, in a racing game, information about whether the frame represents a starting line or a finishing line, etc.) about what situation the frame including the inventory corresponds to in the progress of the game.

Referring to FIG. 7, the first device 200 may transmit information 710 about inventories included in the first content Media 1, information 720 about inventories included in the second content Media 2, and information 730 about inventories included in the third content Media 3 to the advertisement mediating system 100. For example, the information 710 about inventories included in the first content Media 1 may include information representing that a first inventory inventory 1 is an area set in a billboard Stage-1 Billboard of a first stage Stage-1 in the game, a second inventory inventory 2 is an area set in a boss appearing at a final stage, and a N-th inventory inventory N is an area set in a prize offered when the game is cleared.

Also, the information 720 about inventories included in the second content Media 2 may include information representing that a first inventory inventory 1 is an area set in an east wall of an A tower, a second inventory inventory 2 is an area set in a signage of a D building, and a N-th inventory inventory N is an area set in an advertising balloon of the city hall.

Also, the information 730 about inventories included in the third content Media 3 may include information representing that a first inventory inventory 1 is an area set in a north wall of a C shop, a second inventory inventory 2 is an area set in a lobby banner, and a N-th inventory inventory N is an area set in a menu of a coffee shop. However, the information 710, 720, and 730 are not limited to the above-described examples.

The advertisement mediating system 100 may receive information about inventories included in content from the first device 200, and determine whether to register the corresponding inventory based on the information about the inventories. For example, when the information about the inventory received from the first device 200 does not meet the preset criterion, the advertisement mediating system 100 may transmit a message indicating that the corresponding inventory is disallowed to be registered to the first device 200. In contrast, when the information about the inventory meets the preset criterion, the advertisement mediating system 100 may register the corresponding inventory.

Figure 8:
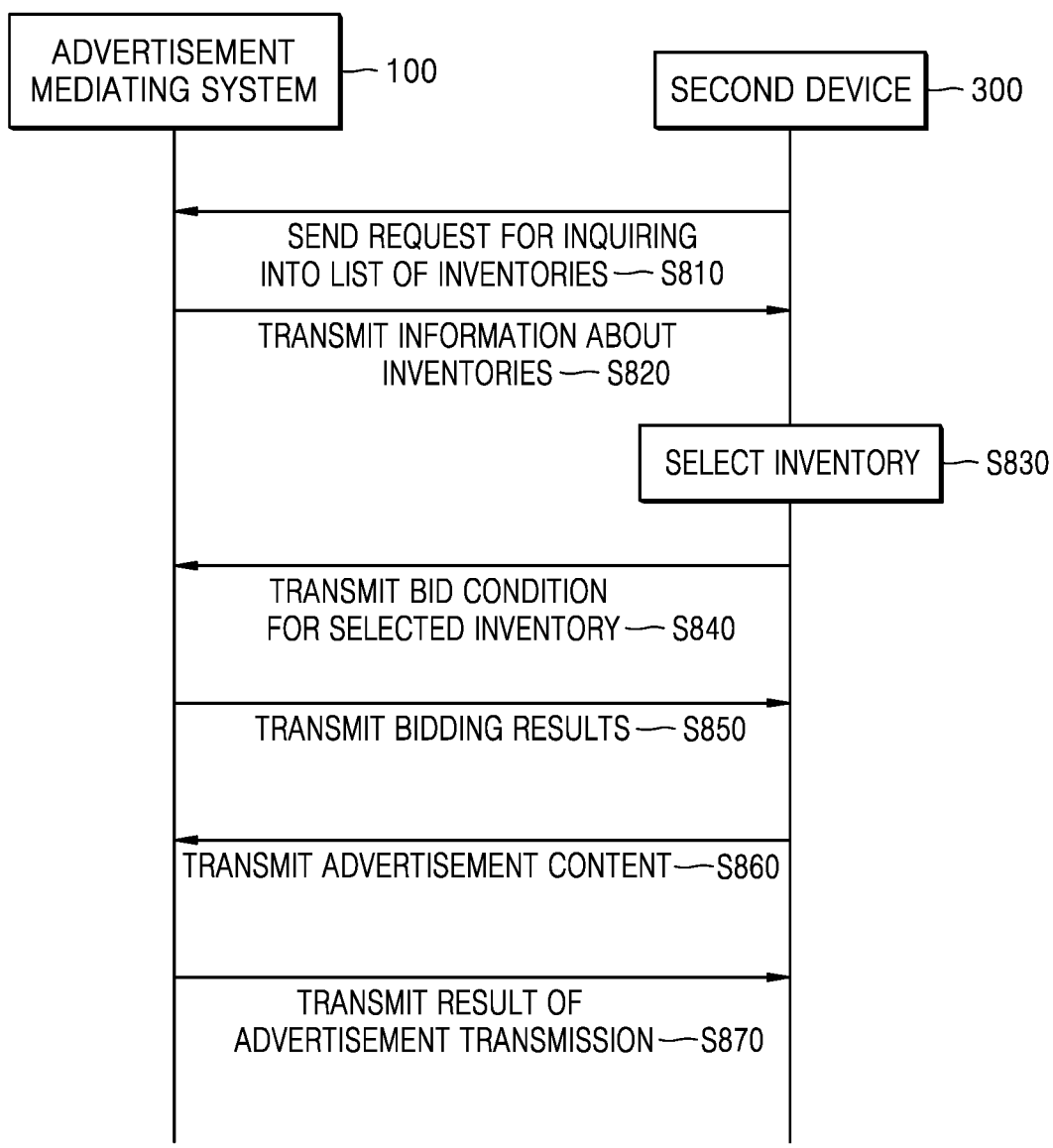
FIG. 8 is a flowchart showing a method in which a second device according to an embodiment makes an advertisement bid for an inventory registered in an advertisement mediating system.
Figure 9:
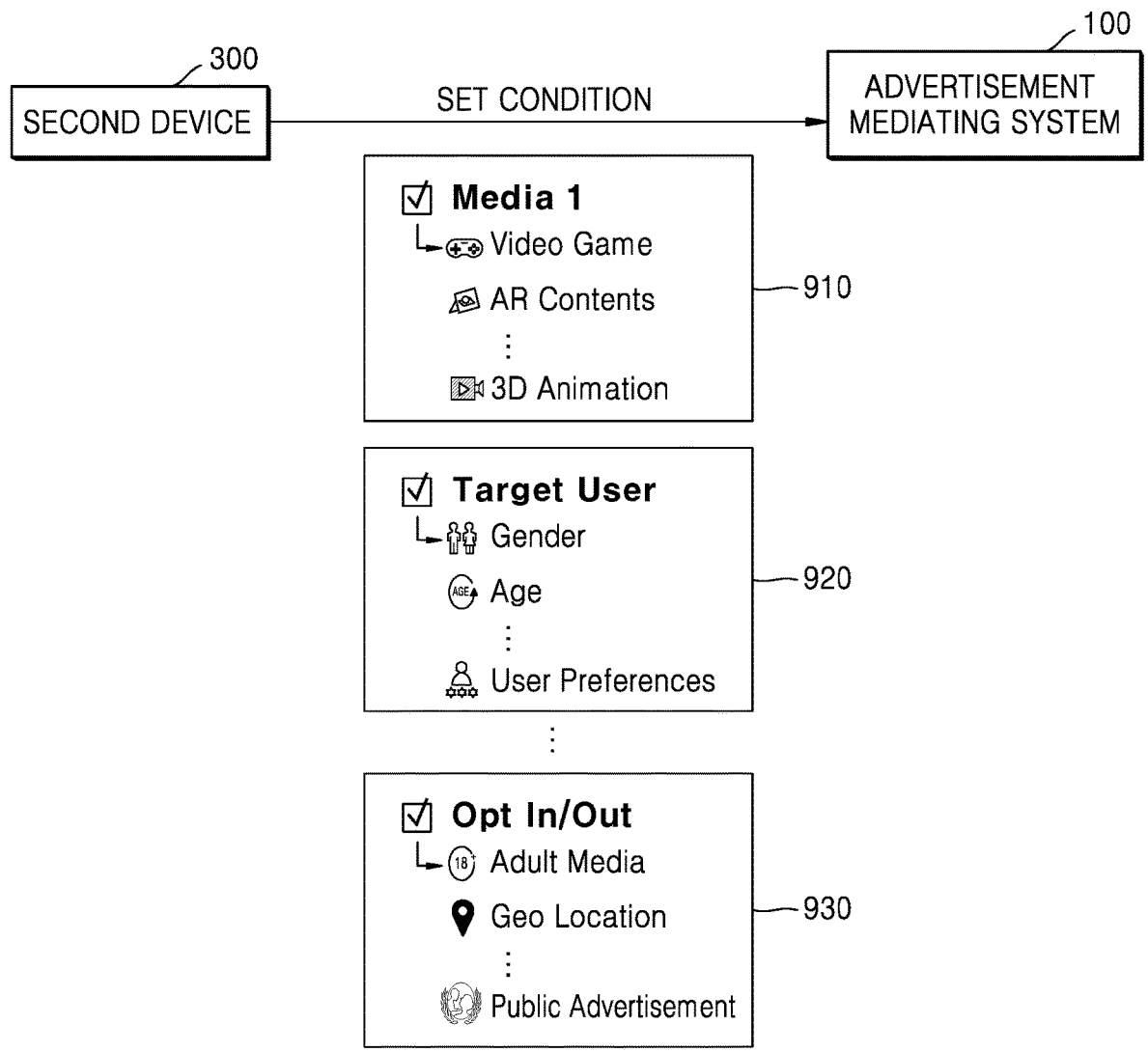
FIGS. 9 and 10 are reference views for describing a method in which a second device according to an embodiment makes an advertisement bid for an inventory registered in an advertisement mediating system.
Figure 10:
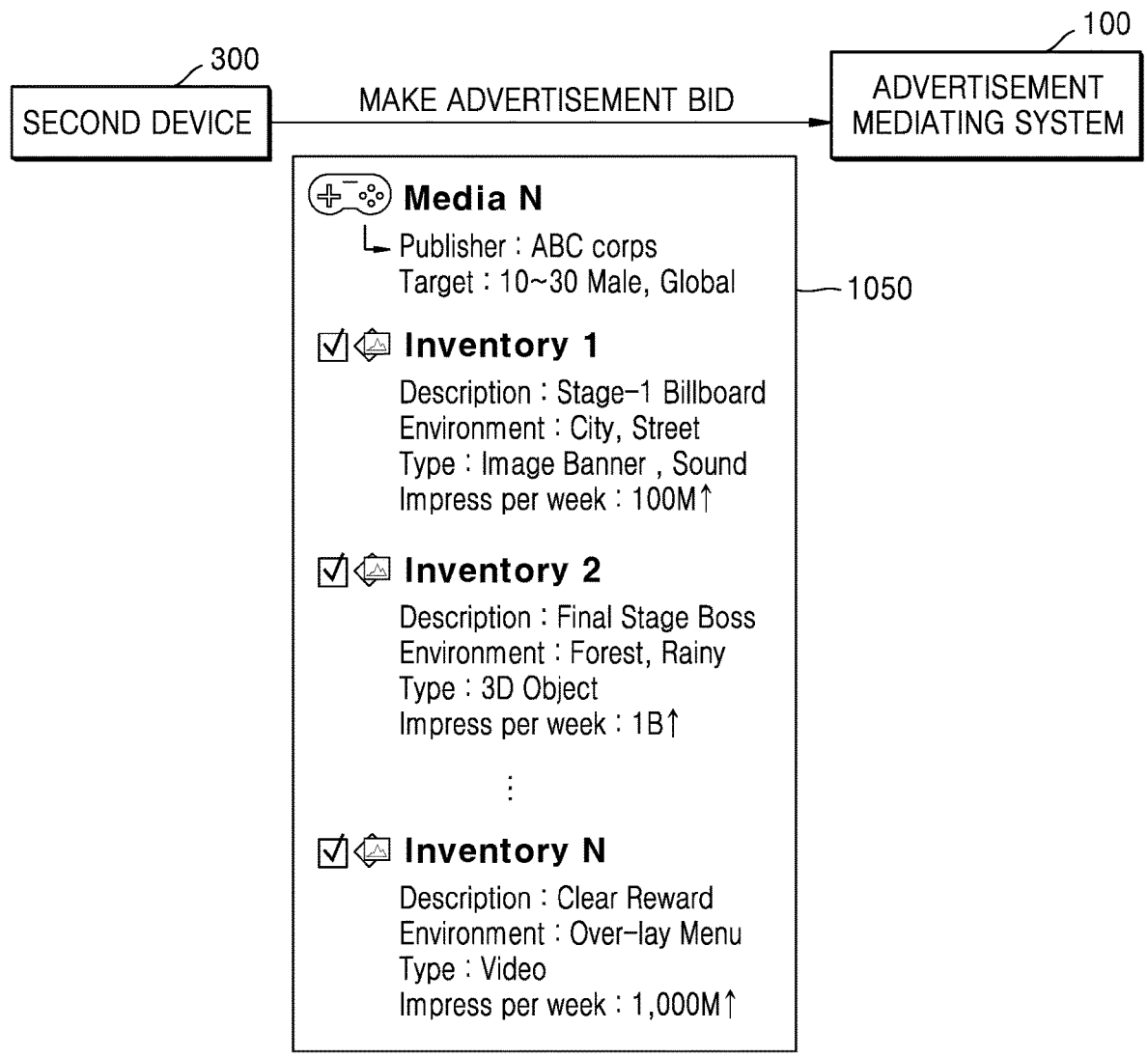

FIG. 8 is a flowchart showing a method in which a second device according to an embodiment makes an advertisement bid for an inventory registered in an advertisement mediating system, and FIGS. 9 and 10 are reference views for describing a method in which a second device according to an embodiment makes an advertisement bid for an inventory registered in an advertisement mediating system.

Referring to FIG. 8, a second device 300 may send a request for inquiring into a list of inventories registered in the advertisement mediating system 100 to the advertisement mediating system 100, in operation S810. Herein, the second device 300 may be a device that advertisers use to search for and select content or an inventory into which they will insert advertisement content. The second device 300 may be a device on which a web page provided from the advertisement mediating system 100 according to an embodiment is displayed.

The advertisement mediating system 100 may transmit information about registered content and inventories to the second device 300, in operation S820. The information about the content may be information provided from the first device 200 to the advertisement mediating system 100, as described above with reference to FIG. 6. The information about the content may include at least one of a kind of the content, category information of the content, provider information of the content, and information about a target user of the content, although not limited thereto.

Also, the information about the inventories may be information provided from the first device 200 to the advertisement mediating system 100, as described above with reference to FIG. 7. The information about the inventories may include at least one of information about objects in which the inventories are set, size information of the inventories, shape information of the inventories, information about formats of advertisements that are insertable into the inventories, and context information of the inventories. The context information of the inventories may include context information of frames in which the inventories are generated, although not limited thereto.

The second device 300 may select an inventory into which an advertisement will be inserted, based on the information provided from the advertisement mediating system 100, in operation S830.

The second device 300 may set a condition for the inventory into which the advertisement will be inserted. For example, as shown in FIG. 9, the second device 300 may set a condition 910 for a kind of content into which the advertisement will be inserted, a condition 920 (for example, a gender, age, preference, etc. of target users) for target users, and other detailed conditions 930 (for example, whether content is an adult stuff, a use region, whether the advertisement to be inserted is an public advertisement, etc.).

The advertisement mediating system 100 may search for matching inventories, based on the condition set by the second device 300 and the information about the registered inventories. The second device 300 may select an inventory into which the advertisement will be inserted from among the matching inventories.

Alternatively, the advertisement mediating system 100 may provide information 1050 about a plurality of inventories registered in the advertisement mediating system 100, as shown in FIG. 10. Accordingly, the second device 300 may select an inventory into which the advertisement will be inserted.

Referring again to FIG. 8, the second device 300 may transmit a bid condition for the selected inventory to the advertisement mediating system 100, in operation S840. For example, the second device 300 may transmit an advertising period, an advertisement price, etc. to the advertisement mediating system 100.

The advertisement mediating system 100 may select a device from among a plurality of devices that make a bid for the inventory selected by the second device 300. The advertisement mediating system 100 may transmit bidding results to the devices that have made the bid for the inventory, in operation S850. For example, the advertisement mediating system 100 may transmit, when the inventory is not awarded to a device, a message indicating that the inventory is not awarded to the device. In contrast, the advertisement mediating system 100 may transmit a message indicating that the inventory is awarded to a device to which the inventory is awarded, and request the device to register advertisement content.

The second device 300 to which the inventory is awarded may transmit advertisement content to the advertisement mediating system 100, in operation S860, and the advertisement mediating system 100 may provide the advertisement content received from the second device 300 to content users (consumers) who execute content including the corresponding inventory. The operation will be described in detail with reference to FIG. 11.

Meanwhile, the advertisement mediating system 100 may transmit a result of advertisement transmission to the second device 300. For example, the advertisement mediating system 100 may transmit statistical information (for example, the number of times that the advertisement has been validly exposed, the number of clicks to the advertisement, the number of exposures for each day, each month, and each year, etc.) related to exposures to the advertisement to the second device 300.

Accordingly, the advertiser may easily analyze an advertising effect or a product purchase effect caused by the advertisement, based on the statistical information related to exposures to the advertisement, received from the advertisement mediating system 100. Also, the information related to exposures to the advertisement may be used as base data when an advertising fee is paid.

Figure 11:
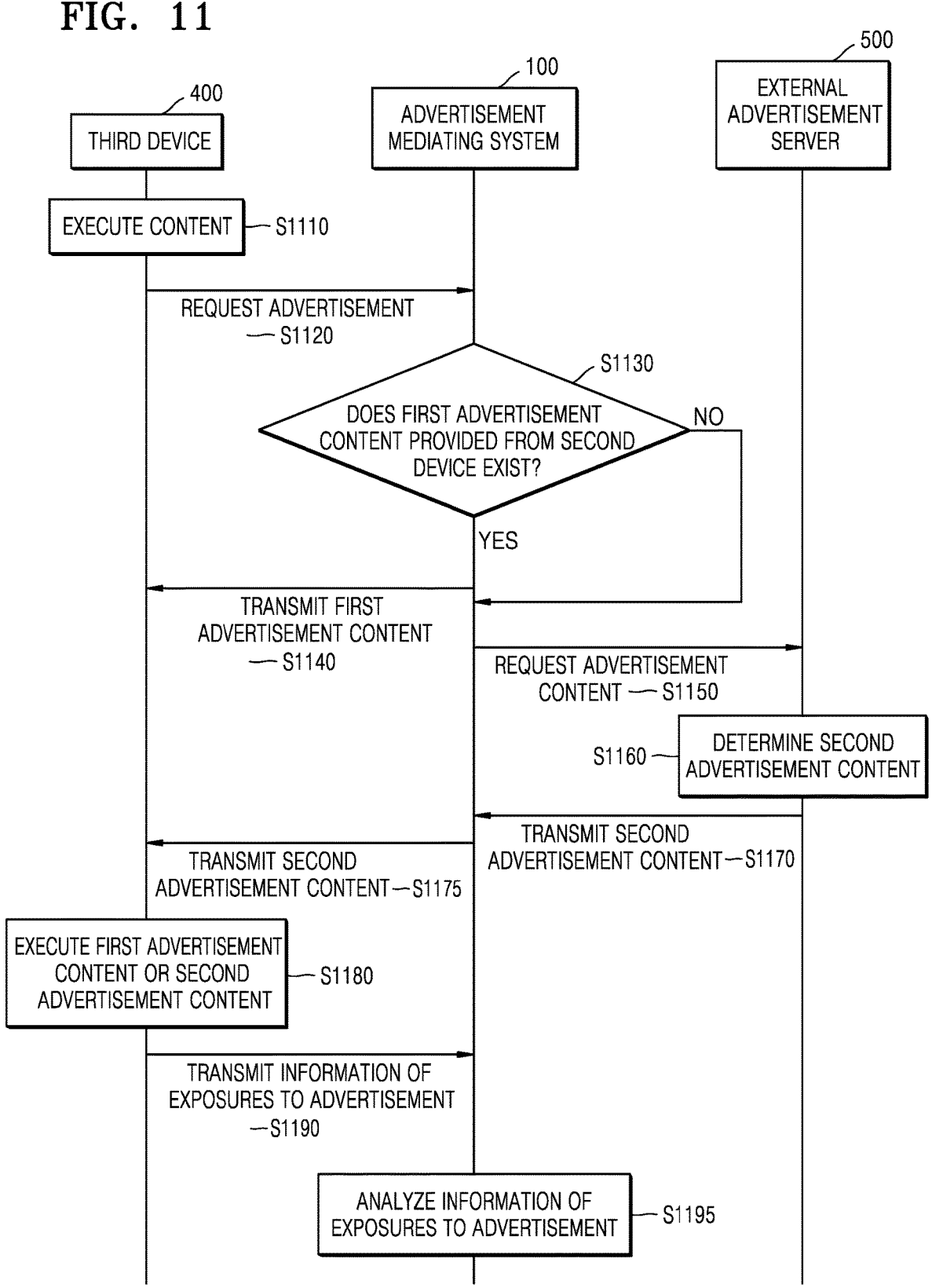
FIG. 11 is a flowchart showing a method in which advertisement content is executed in content, according to an embodiment.

FIG. 11 is a flowchart showing a method in which advertisement content is executed in content according to an embodiment.

Referring to FIG. 11, a third device 400 may execute content, in operation S1110. Herein, the content may include an inventory, and may be various formats of content, such as image content, text content, video content, audio content, game content, AR content, VR content, and 3D content. Also, the content may include an inventory generated by using the advertisement module software described above with reference to FIG. 3 when the content is developed, although not limited thereto.

When the content is executed, the third device 400 may check a connection to a network. When the third device 400 is not connected to a network, the third device 400 may execute advertisement content set in advance in the inventory included in the content. The advertisement content set in advance may be advertisement content set regardless of information about the inventory.

Meanwhile, when the third device 400 is connected to the network, the third device 400 may request the advertisement mediating system 100 to send an advertisement to be inserted into the inventory and executed, in operation S1120.

When the advertisement mediating system 100 receives the advertisement request from the third device 400, the advertisement mediating system 100 may determine whether first advertisement content provided from a second device exists, in operation S1130. The first advertisement content may be advertisement content awarded through a bid for an inventory, as described above with reference to FIG. 8, and may be advertisement content received in operation S860 of FIG. 8.

When the first advertisement content exists, the advertisement mediating system 100 may transmit the first advertisement content to the third device 400, in operation S1140. The third device 400 may execute the first advertisement content received from the advertisement mediating system 100, in operation S1180. For example, the third device 400 may insert, when a frame including a first inventory corresponding to the first advertisement content among a plurality of frames included in the content is displayed, the first advertisement content into the first inventory, and execute the first advertisement content. The operation will be described in detail with reference to FIG. 12.

Meanwhile, when there is no first advertisement content, the advertisement mediating system 100 may obtain advertisement content through an external advertisement server 500. For example, when there is no first advertisement content, the advertisement mediating system 100 may request the external advertisement server 500 to send advertisement content, in operation S1150. At this time, information about the content and information about inventories included in the content may be transmitted to the external advertisement server 500.

The external advertisement server 500 according to an embodiment may include AD exchange (ADX) that mediates transactions between demand side platforms (DSPs) and supply side platforms (SSPs) through auctions. Also, the external advertisement server 500 may include an advertisement network that receives advertisement bids by a programmatic buying method, although not limited thereto.

When second advertisement content to be inserted into the inventory included in the content is determined in operation S1160, the external advertisement server 500 may transmit the second advertisement content to the advertisement mediating system 100, in operation S1170. The advertisement mediating system 100 may transmit the second advertisement content to the third device 400, in operation S1175.

The third device 400 may execute the second advertisement content received from the advertisement mediating system 100, in operation S1180. For example, when the third device 400 displays the frame including the first inventory corresponding to the second advertisement content from among the plurality of frames included in the content, the third device 400 may insert the second advertisement content into the first inventory and execute the second advertisement content. The operation will be described in detail with reference to FIG. 12.

The third device 400 may transmit information related to whether the advertisement content has been validly exposed to a content user (a consumer) to the advertisement mediating system 100, in operation S1190.

For example, the third device 400 may determine whether the advertisement content has been validly exposed, based on a size of the inventory being displayed in an execution screen of the content, whether an obstructing object hiding the inventory exists within a user's viewing angle, a degree of distortion of the advertisement content due to an inclination of the inventory, etc. The operation will be described in detail with reference to FIG. 13. When the third device 400 determines that the advertisement content has been validly exposed, the third device 400 may inform the advertisement mediating system 100 of information of exposures to the advertisement.

The advertisement mediating system 100 may analyze the information of exposures to the advertisement, in operation S1195. For example, the advertisement mediating system 100 may obtain statistical information(the number of times that the advertisement has been validly exposed, the number of clicks to the advertisement, the number of exposures for each day, each month, and each year, etc.) related to exposures to the advertisement by a notice received from the third device 400.

Figure 12:
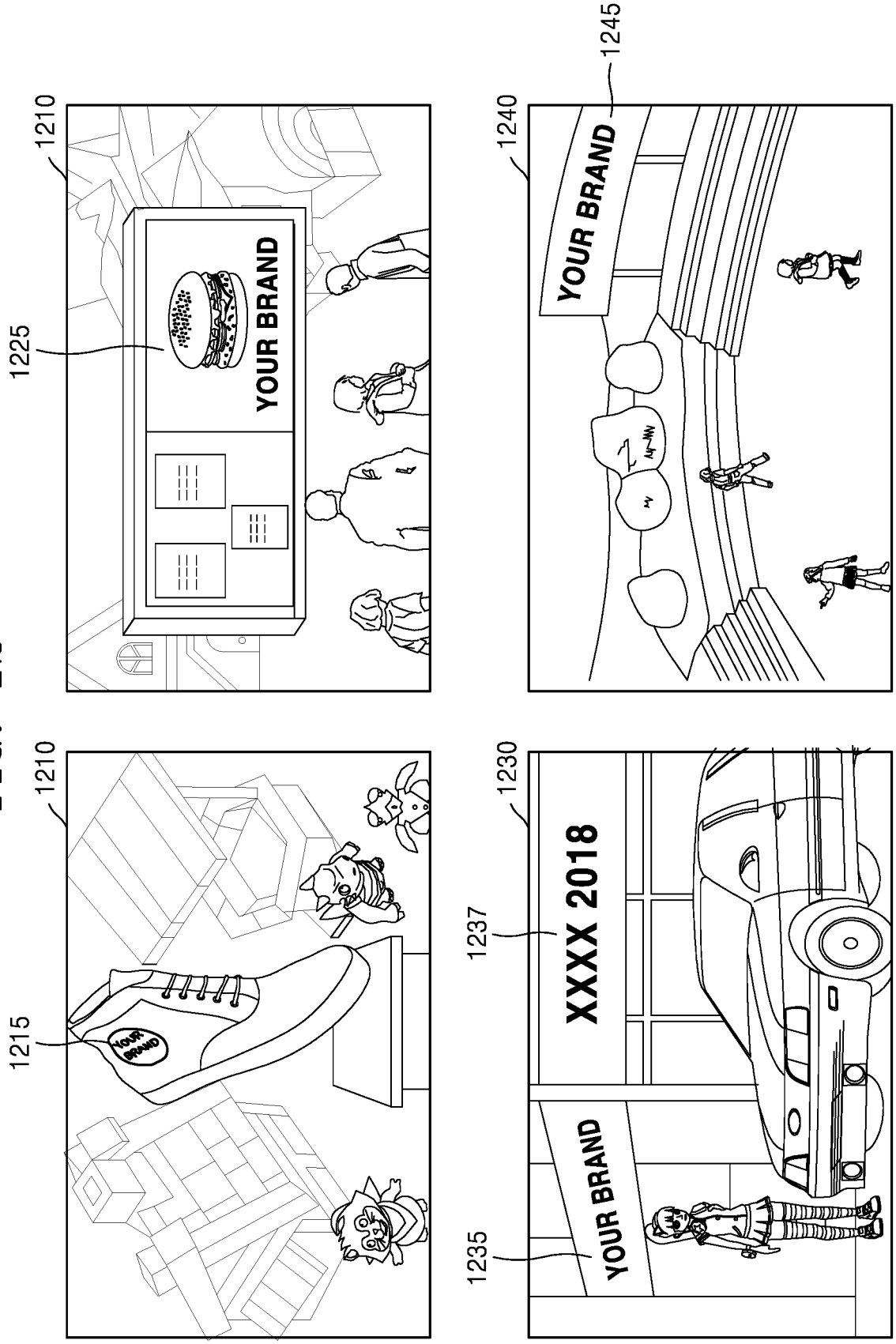
FIG. 12 shows examples in which advertisement content is executed in game content, according to an embodiment.

FIG. 12 shows examples in which advertisement content is executed in game content according to an embodiment.

Referring to FIG. 12, game content according to an embodiment may include a plurality of frames, and for example, the game content may include a first frame 1210, a second frame 1220, a third frame 1230, and a fourth frame 1240.

The first frame 1210 may include a first inventory 1215. The first inventory 1215 may be an inventory generated by a game content developer by using advertisement module software and have a shoe shape. Also, the second frame 1220 may include a second inventory 1225, the third frame 1230 may include a third inventory 1235 and a fourth inventory 1237, and the fourth frame 1240 may include a fifth inventory 1245. The second to fifth inventories 1225 to 1245 may be generated at objects (for example, a signage, a noticeboard, an electric sign, a banner, a sign, etc.) in the second to fourth frames 1220 to 1240.

The first to fifth inventories 1215, 1225, 1235, 1237, and 1245 may match with advertisement content by the method described above with reference to FIGS. 8 to 10, and when game content is executed, the matching advertisement content may be respectively executed in the first to fifth inventories 1215, 1225, 1235, 1237, and 1245.

Figure 13:
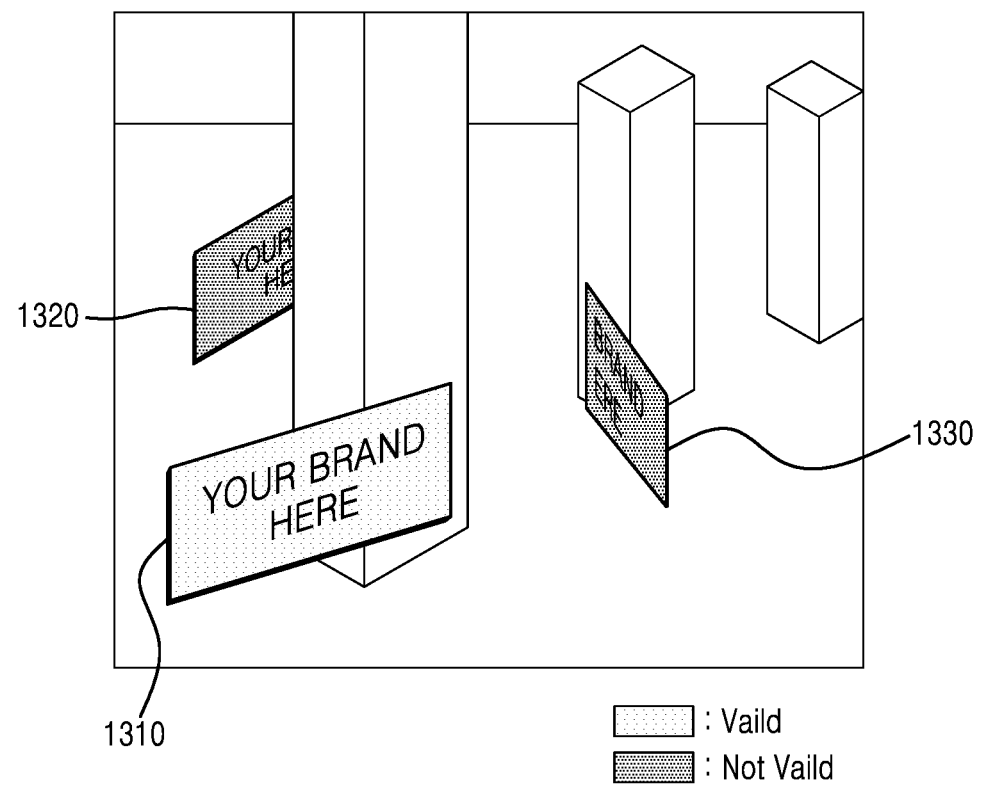
FIG. 13 is a reference view for describing a method of determining whether advertisement content has been validly exposed, according to an embodiment.

FIG. 13 is a reference view for describing a method of determining whether advertisement content according to an embodiment has been validly exposed.

Referring to FIG. 13, content according to an embodiment may include first to third inventories 1310, 1320, and 1330. The first to third inventories 1310, 1320, and 1330 may match with advertisement content 1, advertisement content 2, and advertisement content 3, respectively.

At this time, it may be determined whether the advertisement content 1, the advertisement content 2, and the advertisement content 3 are validly exposed, based on a size of an inventory being displayed in an execution screen of the content, whether an obstructing object hiding the inventory exists within a user's viewing angle, a degree of distortion of the advertisement content due to an inclination of the inventory, etc.

For example, when a size of the first inventory 1310 on which the advertisement content 1 is displayed is larger than or equal to a preset value, no object hiding the first inventory 1310 exists within a content user's viewing angle, and an inclination of the first inventory 1310 is smaller than a preset value, it may be determined that the advertisement content 1 is validly exposed. Meanwhile, when an object hiding the second inventory 1320 on which the advertisement content 2 is displayed exists within the content user's viewing angle, it may be determined that the advertisement content 2 is not validly exposed. Also, when a size of the third inventory 1330 on which the advertisement content 3 is displayed is smaller than the preset value and an inclination of the advertisement content 3 is greater than or equal to the preset value, it may be determined that the advertisement content 3 is not validly exposed. However, a method of determining whether advertisement content has been validly exposed is not limited to the above-described method, and whether advertisement content has been validly exposed may be determined by various methods.

Figure 14:
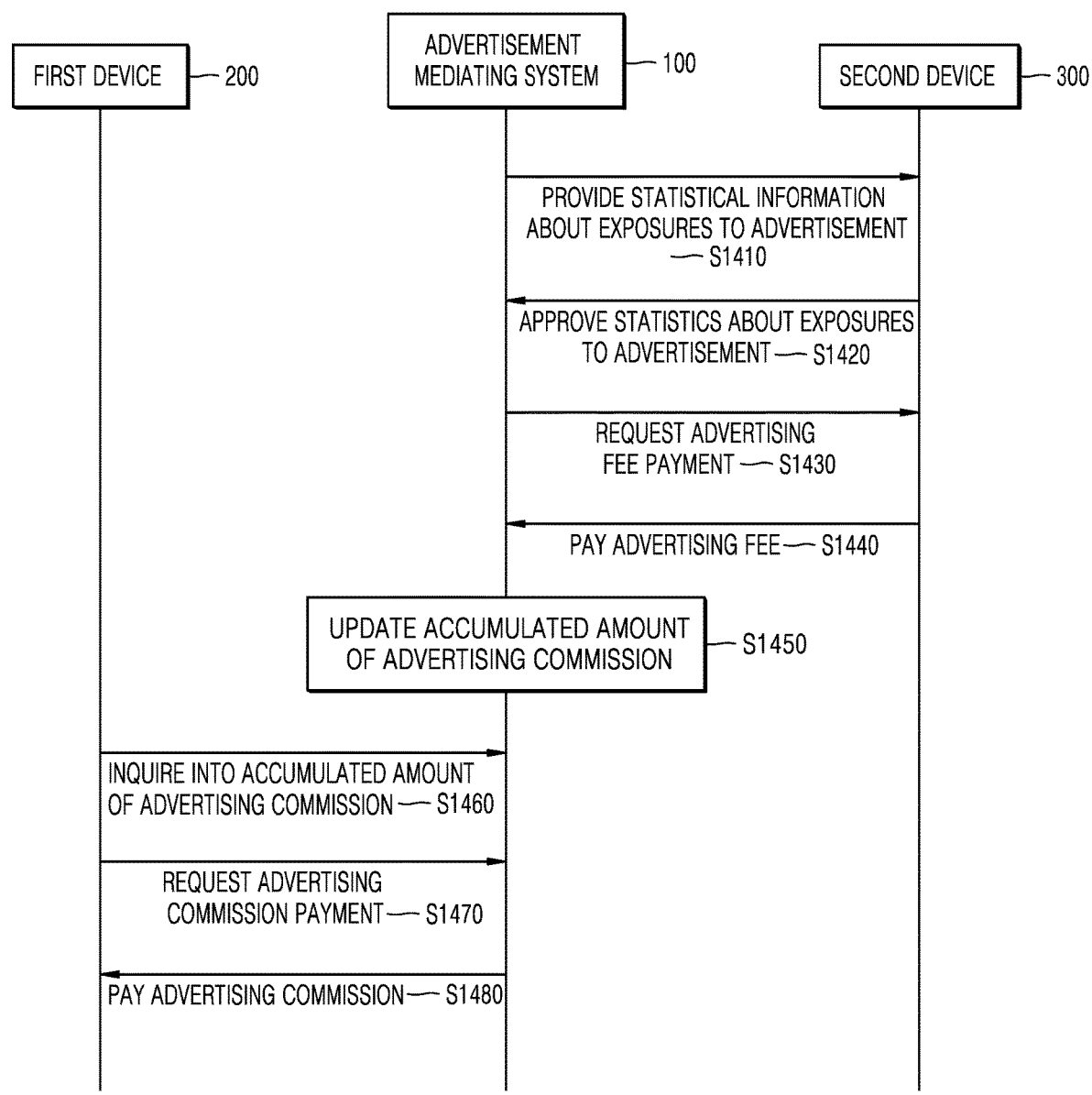
FIG. 14 is a flowchart showing a method of mediating with respect to an advertising fee payment between an advertiser and a content developer in an advertisement mediating system, according to an embodiment.

FIG. 14 is a flowchart showing a method of mediating with respect to advertising fee payment between an advertiser and a content developer in an advertisement mediating system according to an embodiment.

Referring to FIG. 14, the advertisement mediating system 100 according to an embodiment may provide the second device 300 with statistical information about exposures to an advertisement, in operation S1410. The second device 300 may be a device of an advertiser that has provided advertisement content inserted into an inventory of content according to an embodiment.

The advertisement mediating system 100 may provide the second device 300 with the statistical information about exposures to the advertisement, analyzed in operation S1195 of FIG. 11. The statistical information about exposures to the advertisement may include the number of times that the advertisement has been validly exposed, the number of clicks to the advertisement, the number of exposures for each day, each month, and each year, etc. The second device 300 may approve statistics about the exposures to the advertisement, provided from the advertisement mediating system 100, in operation S1420.

The advertisement mediating system 100 may request the second device 300 to pay an advertising fee, in operation S1430, wherein the advertising fee may be determined to be proportional to the number of times that the advertisement has been validly exposed and cost per mile (CPM) (cost per 1000 exposures).

The second device 300 may pay the advertisement mediating system 100 the advertising fee in response to the request for the advertising fee payment from the advertisement mediating system 100, in operation S1440.

The advertisement mediating system 100 may update an accumulated amount of an advertising commission to be paid to the first device 200, according to an increase of the number of times that the advertisement has been validly exposed, in operation S1450.

Herein, the first device 200 may be a device of a developer that has developed the content into which the advertisement has been inserted. The advertising commission may be a part of the advertising fee paid by the advertiser, which will be paid to the content developer. The advertising commission may be determined to be a predefined portion of an advertising fee, although not limited thereto. The advertising commission may be determined by various methods.

The first device 200 may inquire into the accumulated amount of the advertising commission by using the advertisement mediating system 100, in operation S1460. The first device 200 may request the advertisement mediating system 100 to pay the advertising commission, in operation 1470, and the advertisement mediating system 100 may pay the advertising commission in response to the request, in operation S1480.

FIG. 14 relates to a case in which when the first device 200 requests payment of an advertising commission, the advertisement mediating system 100 pays the advertising commission. However, the advertisement mediating system 100 may pay an accumulated amount of an advertising commission periodically for each day, each month or each year, without receiving a payment request from the first device 200.

Figure 15:
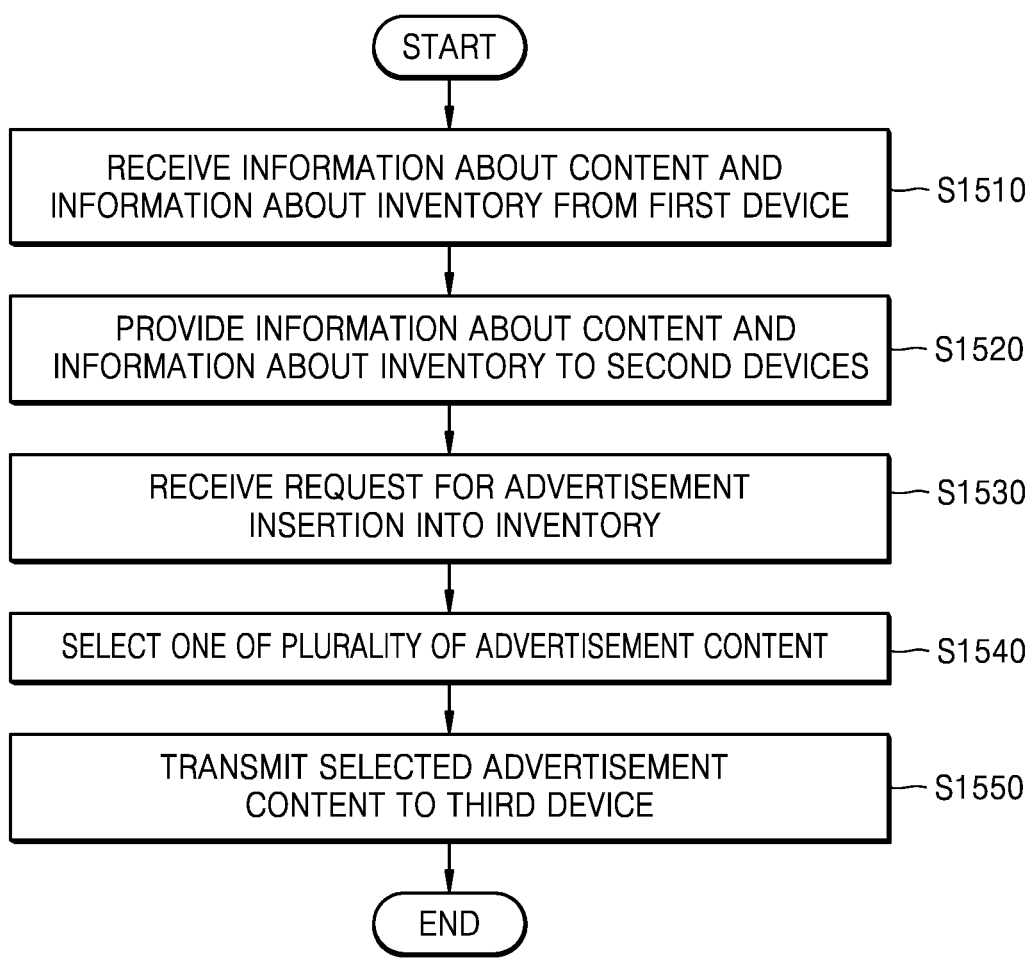
FIG. 15 is a flowchart showing an operation method of an advertisement mediating system, according to an embodiment.

FIG. 15 is a flowchart showing an operation method of an advertisement mediating system according to an embodiment.

Referring to FIG. 15, the advertisement mediating system 100 according to an embodiment may receive information about content into which an advertisement will be inserted and information about an inventory included in the content from the first device 200, in operation S1510.

The information about the content may include at least one of a kind of the content, category information of the content, provider information of the content, and information about a target user of the content. Also, the information about the inventory may include at least one of information about an object in which the inventory is set, size information of the inventory, shape information of the inventory, information about a format of an advertisement that is insertable into the inventory, and context information of the inventory. The context information of the inventory may include context information about a frame in which the inventory is included, although not limited thereto.

The advertisement mediating system 100 may provide the information about the content and the information about the inventory to one or more second devices, in operation S1520.

When the advertisement mediating system 100 receives a request for advertisement insertion into the inventory from the second devices, in operation S1530, the advertisement mediating system 100 may select advertisement content from among a plurality of pieces of advertisement content corresponding to the second devices, in operation S1540.

For example, the advertisement mediating system 100 may select the advertisement content from among the plurality of pieces of advertisement content corresponding to the second devices, based on at least one of a kind of an advertisement to be inserted into the inventory, an advertising period, and a desired purchase price for the inventory, received from the second devices, and information about inventories registered in the advertisement mediating system 100.

After selecting the advertisement content, the advertisement mediating system 100 may perform a control operation of transmitting information about the selected advertisement content to the first device 200 and transmitting the selection result of the advertisement content to the second devices.

The advertisement mediating system 100 may transmit the selected advertisement content to the third device 400 that executes content including the corresponding inventory, in operation S1550.

Also, the advertisement mediating system 100 may analyze whether the selected advertisement content is validly exposed to a content user in the third device 400, and perform a control operation of transmitting a result of the analyzing to the second device 300 that has provided the advertisement content.

The advertisement mediating system 100 according to an embodiment may calculate an advertising fee based on the number of times that the advertisement content has been validly exposed, and calculate an advertising commission for the advertisement content based on the advertising fee. The advertisement mediating system 100 may request the second device 300 (an advertiser) that has provided the advertisement content to pay the advertising free, and perform a control operation of paying the advertising commission the first device 200 (a content developer).

The operation method of the advertisement mediating system 100 according to an embodiment may be implemented in a program command form that can be executed by various computer means, and may be recorded on computer-readable media. The computer-readable media may also include, alone or in combination with program commands, data files, data structures, and the like. Program commands recorded in the media may be the kind specifically designed and constructed for the purposes of the disclosure or well-known and available to those of ordinary skill in the computer software field. Examples of the computer-readable media include magnetic media, such as hard disks, floppy disks, and magnetic tapes, optical media, such as compact disc read only memory (CD-ROM) and digital video disc (DVD), magneto-optical media such as floptical disks, and hardware devices, such as read only memory (ROM), random access memory (RAM), flash memory, and the like, specifically configured to store and execute program commands. Examples of the program commands include high-level language codes that can be executed on a computer through an interpreter or the like, as well as machine language codes produced by a compiler.

Also, the advertisement mediating system and the operation method thereof according to the disclosed embodiments may be included in a computer program product and provided. The computer program product may be traded between a seller and a purchaser.

The computer program product may include a software (S/W) program or a computer-readable storage medium storing an S/W program. For example, the computer program product may include an S/W program product (for example, a downloadable application) electronically distributed through a manufacturing company of an electronic device or an electronic market (for example, Google Play Store or App Store). For electronic distribution, at least one part of the software program may be stored in a storage medium or temporarily created. In this case, the storage medium may be a server of a manufacturing company, a server of an electronic market, or a storage medium of a relay server that temporarily stores an S/W program.

In a system configured with a server and a client, the computer program product may include a storage medium of the server or a storage medium of the client. Also, when there is a third device (for example, a smart phone) communicating with the server or the client, the computer program product may include a storage medium of the third device. Also, the computer program product may include an S/W program that is transmitted from the server to the client or the third device or from the third device to the client.

In this case, one of the server, the client and the third device may execute the computer program product to perform the method according to the disclosed embodiments. Also, two or more of the server, the client, and the third device may execute the computer program product to distributively perform the method according to the disclosed embodiments.

For example, the server (for example, a cloud server or an artificial intelligence (AI) server) may execute the computer program product stored in the server to control the client communicating with the server to perform the method according to the disclosed embodiments.

Although the embodiments of the disclosure have been described in detail, the scope of rights of the disclosure is not limited to these embodiments. It will be understood that various modifications and variations may be made by those skilled in the art based on the fundamental concept of the disclosure as defined by the appended claims.

What is claimed is:

1. A system comprising:
   an advertisement mediating system; and
   a first electronic device,
   wherein the advertisement mediating system comprises:
      a first communication circuit;
      a memory storing one or more instructions; and
      a first processor configured to execute the one or more instructions stored in the memory,
      wherein the one or more instructions, when executed, configure the first processor to perform:
         controlling the first communication circuit to receive, from a second electronic device providing content, content information about the content for execution by the first electronic device into which advertisements are insertable and display area information about display areas included in the content for displaying the advertisements,
         controlling the first communication circuit to transmit, to one or more third electronic devices, the content information and the display area information,
         controlling the first communication circuit to receive, from the one or more third electronic devices, requests for identifications and conditions of one or more advertisements,
         based on the request information, selecting, from among the one or more advertisements, first advertisements to be inserted into the display areas included in the content,
         controlling the first communication circuit to receive the selected first advertisements,
         controlling the first communication circuit to receive a request for an advertisement for a display area transmitted over a communication network from the first electronic device currently executing the content,
         based on identifying one of the first advertisements for responding to the request, controlling the first communication circuit to transmit, as the requested advertisement, the identified first advertisement to the first electronic device over the communication network for display in the display area,
         based on identifying no one of the first advertisements for responding to the request:
            controlling the first communication circuit to transmit a request to an external advertisement server requesting to transmit to the advertisement mediating system an advertisement to be inserted into the display area, the request including the content information and the display area information, wherein a second advertisement to be inserted into the display area is determined by the external advertisement server,
            controlling the first communication circuit to receive, from the external advertisement server, the second advertisement to be inserted into the display area, and
            controlling the first communication circuit to transmit, as the requested advertisement, the second advertisement to the first electronic device over the communication network for display in the display area,
         controlling the first communication circuit to receive from the first electronic device exposure information for the requested advertisement about whether the requested advertisement is validly exposed when the requested advertisement is displayed in the display area during the executing of the content by the first electronic device determining a payment amount for the requested advertisement based on the exposure information, and requesting one of the one or more third electronic devices corresponding to the requested advertisement, to pay the determined payment amount, and paying an advertising commission determined based on the determined payment amount to the second device, and wherein the first electronic device comprises a second communication circuit and a second processor configured to execute one or more instructions to configure the second processor to perform:

executing the content, controlling the second communication circuit to transmit the request for the advertisement to the advertisement mediating system;

controlling the second communication circuit to receive the requested advertisement from the advertisement mediating system;

controlling to insert the requested advertisement into the content, generating the exposure information, the exposure information being indicative of exposure of the requested advertisement in the display area at a time during the executing of the content by the first electronic device and being based on at least one of a size of the requested advertisement displayed in the display area being equal to or larger than a preset size value when the content is executed by the first electronic device, no object obstructing the requested advertisement displayed in the display area within a line of sight of a viewing angle of the requested advertisement when the content is executed by the first electronic device, or an inclination of the requested advertisement displayed in the display area being less than a preset inclination angle when the content is executed by the first electronic device, controlling the second communication circuit to transmit the exposure information to the advertisement mediating system.

2. The system of claim 1, wherein the content information about the content includes at least one of a kind of the content, category information of a category of the content, provider information of a provider of the content, or target user information about a target user of the content.

3. The system of claim 1, wherein the display area information includes at least one of information about an object in which the display area is set, size information of a size of the display area, shape information of a shape of the display area, format information about a format of an advertisement that is insertable into the display area, or context information of a context of the display area.

4. The system of claim 1, wherein the display area is set in an object included in the content.

5. The system of claim 1, wherein the one or more instructions configure the first processor to control the first communication circuit to transmit, to the second electronic device, advertisement module software for generating the display areas included in the content.

6. The system of claim 1, wherein the conditions include at least one of a type of content to be inserted into the display area, an advertising period, or a desired purchase price for the display area, received from the one or more third electronic devices, and the information about the display areas.

7. The system of claim 1, wherein the one or more instructions configure the first processor to control the first communication circuit to transmit, to the second electronic device, information about the selected advertisements, and to transmit, to the one or more third electronic devices, information about the selected first advertisements.

8. An operation method of a system comprising an advertisement mediating system and a first electronic device, comprising:

receiving, from a second electronic device providing content, content information about the content for execution by the first electronic device into which advertisements are insertable and display area information about display areas included in the content for displaying the advertisements, by the advertisement mediating system;

transmitting, to one or more third electronic devices, the content information and the display area information, by the advertisement mediating system;

receiving, from the one or more third devices, requests for identifications and conditions of one or more advertisements, by the advertisement mediating system;

based on the requests, selecting, from among the one or more advertisements, first advertisements to be inserted into the display areas included in the content, by the advertisement mediating system;

receiving the selected first advertisements, by the advertisement mediating system;

executing the content, by the first electronic device, transmitting the request for the advertisement to the advertisement mediating system, by electronic device;

receive a request for an advertisement for a display area transmitted over a communication network from the first electronic device currently executing the content by the advertisement mediating system;

based on identifying one of the first advertisements for responding to the request, transmitting, as the requested advertisement, the identified first advertisement to the first electronic device over the communication network for display in the display area, by the advertisement mediating system;

based on identifying no one of the first advertisements for responding to the request, by the advertisement mediating system:

transmitting a request to an external advertisement server requesting to transmit to the advertisement mediating system an advertisement to be inserted into the display area, the request including the content information and the display area information, wherein a second advertisement to be inserted into the display area being determined by the external advertisement server, receiving, from the external advertisement server, the second advertisement to be inserted into the display area, and transmitting, as the requested advertisement, the second advertisement to the first electronic device over the communication network for display in the display area, receiving the requested advertisement from the advertisement mediating system, by the first electronic device;

inserting the requested advertisement into the content, by the first electronic device;

generating the exposure information, by the first electronic device, the exposure information being indicative of exposure of the requested advertisement in the display area at a time during the executing of the content by the first electronic device and being based on at least one of a size of the requested advertisement displayed in the display area being equal to or larger than a preset size value when the content is executed by the first electronic device, no object obstructing the requested advertisement displayed in the display area within a line of sight of a viewing angle of the requested advertisement when the content is executed by the first electronic device, or an inclination of the requested advertisement displayed in the display area being less than a preset inclination angle when the content is executed by the first electronic device;

transmitting the exposure information to the advertisement mediating system, by the first electronic device;

receiving from the first electronic device, by the advertisement mediating system, exposure information for the requested advertisement about whether the requested advertisement is validity exposed when the requested advertisement is displayed in the display area during the executing of the content by the first electronic device;

determining a payment amount for the requested advertisement based on the exposure information, by the advertisement mediating system; and requesting one of the one or more third electronic devices corresponding to the requested advertisement to pay the determined payment amount, and paying an advertising commission determined based on the determined payment amount to the second device.

9. The operation method of claim 8, further comprising transmitting, to the second electronic device, advertisement module software for generating the display areas included in the content.

10. The operation method of claim 8, wherein the conditions include at least one of a type of content to be inserted into the display area, an advertising period, and a desired purchase price for the display area, received from the one or more third electronic devices, or the information about the display area.

11. The operation method of claim 8, further comprising:
transmitting, to the second electronic device, information about the selected advertisements; and
transmitting, to the one or more third electronic devices, information about the selected advertisements.

* * * * *